(12) United States Patent
Herbert et al.

(10) Patent No.: US 7,573,402 B2
(45) Date of Patent: Aug. 11, 2009

(54) DUAL LASER BEAM GUIDANCE AND PARKING DEVICE

(76) Inventors: William J. Herbert, 7711 Westlake Blvd., Kent, OH (US) 44240; Stephen McFarland, 20854 Paloma St., St. Clair Shores, MI (US) 48080; Anthony Dechiara, 10363 Clear Brook Cir., Wadsworth, OH (US) 44281

( * ) Notice: Subject to any disclaimer, the term of this patent is extended or adjusted under 35 U.S.C. 154(b) by 170 days.

(21) Appl. No.: 11/510,377

(22) Filed: Aug. 25, 2006

(65) Prior Publication Data
US 2007/0046500 A1    Mar. 1, 2007

Related U.S. Application Data

(60) Provisional application No. 60/711,331, filed on Aug. 25, 2005.

(51) Int. Cl.
  *B60Q 1/48*    (2006.01)
(52) U.S. Cl. .................... 340/932.2; 340/933; 340/958; 340/988; 340/686.2; 340/556; 340/557
(58) Field of Classification Search ............. 340/932.2, 340/933, 958, 988, 555, 556, 557, 686.2; 116/28 R; 180/199; 250/491.1; 399/400
See application file for complete search history.

(56) References Cited

U.S. PATENT DOCUMENTS

| | | | |
|---|---|---|---|
| 5,285,205 A | 2/1994 | White | |
| 5,343,295 A | 8/1994 | Lara et al. | |
| 5,406,395 A | 4/1995 | Wilson et al. | |
| 5,841,368 A | 11/1998 | Bryant | |
| 6,002,346 A | 12/1999 | Bowden et al. | |
| 6,040,787 A | 3/2000 | Durham | |
| 6,120,052 A | 9/2000 | Capik et al. | |
| 6,154,150 A | 11/2000 | Laubach | |
| 6,176,505 B1 | 1/2001 | Capik et al. | |
| 6,184,800 B1 | 2/2001 | Lewis | |
| 6,191,706 B1 | 2/2001 | Kositkun | |
| 6,531,966 B2 | 3/2003 | Krieger | |
| 6,704,098 B2 * | 3/2004 | Anderberg | ................ 356/4.01 |
| 6,995,662 B2 | 2/2006 | Wortsmith | |
| 2002/0140576 A1 | 10/2002 | Simon | |
| 2003/0160705 A1 | 8/2003 | Guetz | |
| 2005/0134482 A1 | 6/2005 | Li | |

* cited by examiner

Primary Examiner—Hung T. Nguyen

(57) ABSTRACT

A vehicle guidance and parking system that continuously guides the operator of a vehicle to a pre-determined parking position by using two laser beams impinging on a forward or rearward surface. The two lasers beams project to a substantially vertical surface to which a vertical line has been applied and the vehicle is guided by the operator such that the two laser beams are kept equidistantly horizontally centered around the line during the vehicle approach to maintain the correct lateral position in the pre-determined parking position. When the two laser beams converge on the vertical line, the vehicle is longitudinally positioned to the pre-determined parking position. Temperature compensation, due to the wide temperature of potential use range, is provided by the laser emitting device used in the vehicle guidance and parking system. A light blocking shroud is used around the vertical line in bright sunlight conditions when necessary to improve the visibility of the two laser beam outputs for vehicle maneuvering.

12 Claims, 10 Drawing Sheets

DUAL LASER BEAM GUIDANCE AND PARKING DEVICE

This application claims priority from U.S. Ser. No. 60/711,331, entitled DUAL LASER BEAM GUIDANCE AND PARKING DEVICE, filed Aug. 25, 2005.

STATEMENT REGARDING FEDERALLY SPONSORED RESEARCH OR DEVELOPMENT

Not applicable.

I BACKGROUND OF THE INVENTION

A. Field of Invention

This invention pertains to temperature compensating dual laser devices and methods for guiding vehicles to accurate pre-determined locations using converging laser beams emitting from inside a vehicle interior or an enclosed vehicle exterior location. The pre-calibrated location includes both longitudinal distance from a surface vertical line forward or rearward from the vehicle and also centering the vehicle laterally whereby the longitudinal distance accuracy is controlled by an automatic temperature compensating laser emitting device.

B. Description of the Related Art

It is well known to use a number of different devices to aid the driver of a vehicle in parking the vehicle in the correct position within a parking space, such as a garage. As vehicle sizes and garage storage of miscellaneous items such as lawn mowers, tools, bicycles, waste containers, etc. have increased, it has become increasingly difficult to properly park vehicles in the desired location. It is common for the driver of a vehicle to park their vehicle in a non-optimum position that result in the vehicle being positioned too close to the garage wall or even damaging it, parking too far away from the garage wall thus preventing the garage door from closing requiring repositioning the vehicle, or parking too far left or right laterally in the garage resulting in limited space to open the vehicle doors or causing damage to the vehicle doors when opened.

A number of devices are known to aid the driver of a vehicle in achieving the desired parking position within a garage. Various devices providing a physical object within the garage, as a target for the vehicle driver, are known. These devices include a soft ball on a string mounted to the garage ceiling, a parking stop placed on the garage floor, a flexible shaft mounted flag placed on the garage floor, and a floor mounted tire contact. Each of these devices requires contact with the vehicle and are obstacles when the vehicle is not parked in the garage. A tire contacting device is shown in U.S. Pat. 5,841, 368 to Bryant. In addition, these devices do not provide continuous guidance to the driver to achieve lateral centering within the parking space desired. A number of other devices for vehicle parking in garages include laser light devices pointing down from the ceiling of garages projecting a single laser dot, which is calibrated to impinge on a target on the hood, windshield, or dashboard of the vehicle. However, these devices require inconvenient ceiling installation and do not guide the vehicle into the proper parking position for both distance from the garage wall and lateral centering within the parking space. By the time that the laser dot is seen by the vehicle driver, insufficient distance is left to adjust the vehicle position for proper lateral centering location. As a result, the driver of the vehicle may be required to reposition their vehicle to achieve lateral centering or be content with their vehicle to be parked at an angle within the garage.

Such devices are shown in U.S. Pat. No. 6,191,706 to Kositkum, U.S. Pat. No. 6,002,346 to Bowden, U.S. Pat. No. 6,154,150 to Laubach, U.S. Pat. No. 6,531, 966 to Krieger, US Application 20020140576 by Simon and U.S. Application 20030160705 by Guetz.

U.S. Pat. No. 5,285,205 to White discloses a laser guided vehicle position system and method that utilizes a wall mounted vertically angled single laser device that projects forward to a target position on a vehicle windshield. However, such a device and method has the drawbacks of requiring a wall mounting of the laser device, placing a target on the windshield of a vehicle, and maneuvering the vehicle such that the laser beam can be seen by the vehicle driver at the entrance to a parking position, which is extremely difficult, especially in bright sunlight conditions on a transparent windshield surface.

Other devices for vehicle parking purposes include U.S Pat. No. 6,184,800 to Lewis, which uses a single laser device used in the interior of a vehicle to project an image on the garage wall that descends to a pre-determined position as the vehicle approaches the correct stopping point. However, no accurate lateral guidance can be provided by using a single laser if the vehicle approaches the garage wall at an angle. U.S Pat. No. 6,853,313 to Newcomer describes a dual laser line device that is mounted above the vehicle that emits a laser line in the center plane of the vehicle and another laser line at 90° to the center plane laser line. These two lines intersect at a target point on the vehicle when the correct vehicle position is achieved. However, the intersection of the laser line and dot do not provide continuous guidance to the vehicle operator to achieve the precise parking position desired. Also, achieving sufficient brightness of two line laser outputs for proper observation by the driver is a major issue in bright sunlight conditions. In addition, this device is significantly more complex, requires mounting on the garage ceiling, and consumes significantly more power than the present invention.

Additional devices for vehicle parking purposes include U.S. Pat. No. 5,406,395 to Wilson, et al that utilizes projected images and state of focus on a forward screen. The projected images can be holograms or images. U.S. Pat. No. 6,040,787 to Durham discloses a dual laser output device that utilizes a laser and a beam splitting device to project a dot and a line output forward of the vehicle. When the dot and line converge longitudinal distance control is achieved, but vehicle lateral positioning is not achieved.

U.S. Pat. No. 5,343,295 to Lara et al. discloses positioning of an electrically powered vehicle to an electrical charging station using two converging lasers mounted on the outside of the vehicle, in the middle of a grill, for example. The vehicle is moved towards a target on the electrical charging station and is presumably aligned properly when the two lasers intersect on the target. However, this patent does not teach that the two laser outputs must be equidistantly aligned on both sides of the target at all times as the vehicle is moved forward towards the target to achieve exact lateral centering and longitudinal distance positioning. For example, the electric vehicle using the teaching of the cited patent could approach the target at a 30 degree angle and still align both laser outputs on the target. The cited patent also does not teach that accuracy of the laser convergence point can be strongly affected by any thermal expansion or contraction of the actual device or attachment points to the vehicle used with the lasers. Thermal expansion within the device holding the two lasers, for example in hot locations, could separate the two lasers and greatly affect their point of convergence thus significantly compromising distance control to the electric docking station.

U.S. Pat. No. 6,120,052 for an optically guided trailer hitching system and U.S. Pat. No. 6,176,505 B1 for an optically guided alignment system to Capik et al. describe optical guidance systems externally mounted to a vehicle that utilize two different color optical sources that produce a third color on a target when the vehicle target location is reached. However, the current invention of this application overcomes several significant deficiencies in the Capik patents that result in a superior, easier to use method and device for accurate vehicle positioning. They are summarized as follows:

A—Slight misalignment of the two optical sources in the Capik patents can result in the two optical sources not aligning and therefore not producing a third color to indicate correct positioning has been achieved. The current invention of this application using a vertical line and two laser dots of the same color vertically aligned around it during vehicle approach and on it in the final vehicle position cannot suffer this deficiency.

B—Broad temperature ranges in use can affect longitudinal and lateral distance accuracy due to thermal expansion or contraction of the surface to which the lasers are mounted, thermal expansion or contraction of the laser holders, or thermal expansion or contraction of the particular lasers used. The current invention of this application has thermal compensation for a broad temperature use range.

C—The use of the a longitudinal target or a led sensor plate as shown in FIG. 9 of Capik patents result in an increases the cost/complexity and is not as accurate or as visually easy to use by the vehicle operator as in the current invention of this application.

D—The Capik U.S. Pat. 6,176,505 indicates that viewing the emission of the third colored light especially in sunlight can be facilitated by the use of a reflective tape or horizontal bar. Neither of these methods provide continuous maneuvering guidance or final vehicle position to the vehicle operator since, in bright sunlight, unless a shroud is used over the target, the laser beams are extremely difficult to see in sunlight. The current invention of this application provides shading over the vertical line to allow significantly improved beam visibility to the vehicle operator. It has also been discovered that the current invention also has the significant advantage by virtue of two lasers converging on a vertical line rather than on each other to use relatively inexpensive red lasers with increased power output (e.g. 5 milliwatt instead of 2.5 milliwatt) or inherent brightness by virtue of the red laser wavelength (e.g. 635 nm instead of 650 nm) to achieve significantly improved brightness in sunlight conditions and still meet the FDA requirements for Class 111a laser devices.

The Capik patents also do not teach that laser devices mounted internally within a vehicle are not subject to the variety of conditions that can render unprotected externally mounted laser devices ineffective or undesirable such as dirty laser lens from outside dust, rain, ice, vandalism, or theft of the laser devices utilized.

U.S. patent application Publication, US 2005/0134482 by Xugang Li teaches the use of two light sources (e.g. lasers) mounted on the front most region of the vehicle that direct the light beams forward of the vehicle. In the preferred embodiment, these two light beams are both projected on a forward surface where the width between the light source dots is equivalent to the distance from the front most region of the vehicle. However, this method requires the vehicle driver to make an estimate on when the width between the dots is at the desired distance of the vehicle from the forward wall and is, therefore, not highly accurate for distance control from the forward surface. In another embodiment of the publication, a third light source is projected substantially perpendicular to the longitudinal axis of the vehicle on a side wall of the parking space for marking the vehicle's forward position. However, this method requires the vehicle driver to both look forward and sideward to verify the vehicle position and also requires a side wall to be present, which is not generally available in parking garages or parking decks.

II. SUMMARY OF THE INVENTION

The present invention provides methods and apparatuses for a new and improved vehicle positioning method and also temperature compensating dual laser devices to achieve high accuracy in vehicle positioning. It is simple in design and overcomes the aforementioned disadvantages of all prior art. The difficulties inherent in the prior art are therefore overcome in a way that is simple and efficient, while providing improved and more advantageous results. The present invention utilizes two laser beams that are emitted from the inside of a vehicle such as the dash, windshield, rearview mirror bracket, rear window, radar detector or from the outside of a vehicle in an enclosed exterior location such as the headlamp assemblies, rear view mirrors, or taillight assemblies. Since the broad temperature ranges that can be experienced by the vehicle ranging from sub-freezing to approximately 150° F. can significantly affect the longitudinal calibration point, one important aspect of the present invention, is a new dual laser vehicle positioning device that is temperature compensating either by its inherent design or by the use of materials with different thermal expansion coefficients, resulting in a broad use temperature range for vehicles and high accuracy of longitudinal and lateral distance control even when vehicle positioning is done in hot summer or cold winter conditions.

By using a method of equidistantly aiming the two temperature compensated converging laser beams horizontally around a vertical line placed on a surface point forward or rearward as a vehicle reaches the entrance to the pre determined parking position and maintaining that equidistant spacing as the vehicle moves forward or rearward into the parking position, lateral positioning of the vehicle is obtained. When the two lasers dots converge on the forward or rearward vertical line, longitudinal positioning of the vehicle is achieved. This method has a significant advantage over other art since the two laser dots are much more visible in entering a parking position within an enclosed parking space or within a shroud enclosing a vertical line in bright sunlight conditions, are extremely easy for the vehicle operator to visually use to achieve the desired parking position, and are inherently visually easier to accurately align the two laser outputs on the vertical line and thus achieve higher accuracy in the vehicle parking position.

The present invention can also be utilized to precisely position a towing vehicle to a towed vehicle for engagement of the trailer hitch to the ball of the towed object by mounting the dual lasers on the inside back window of the vehicle. In bright sunlight conditions, where the laser dots may not be adequately visible, an enclosed shroud placed over the vertical line is used to shield the vertical line from the bright light conditions allowing the vehicle operator visibility for vehicle positioning.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DETAILED DESCRIPTION OF THE INVENTION

Figure 1:
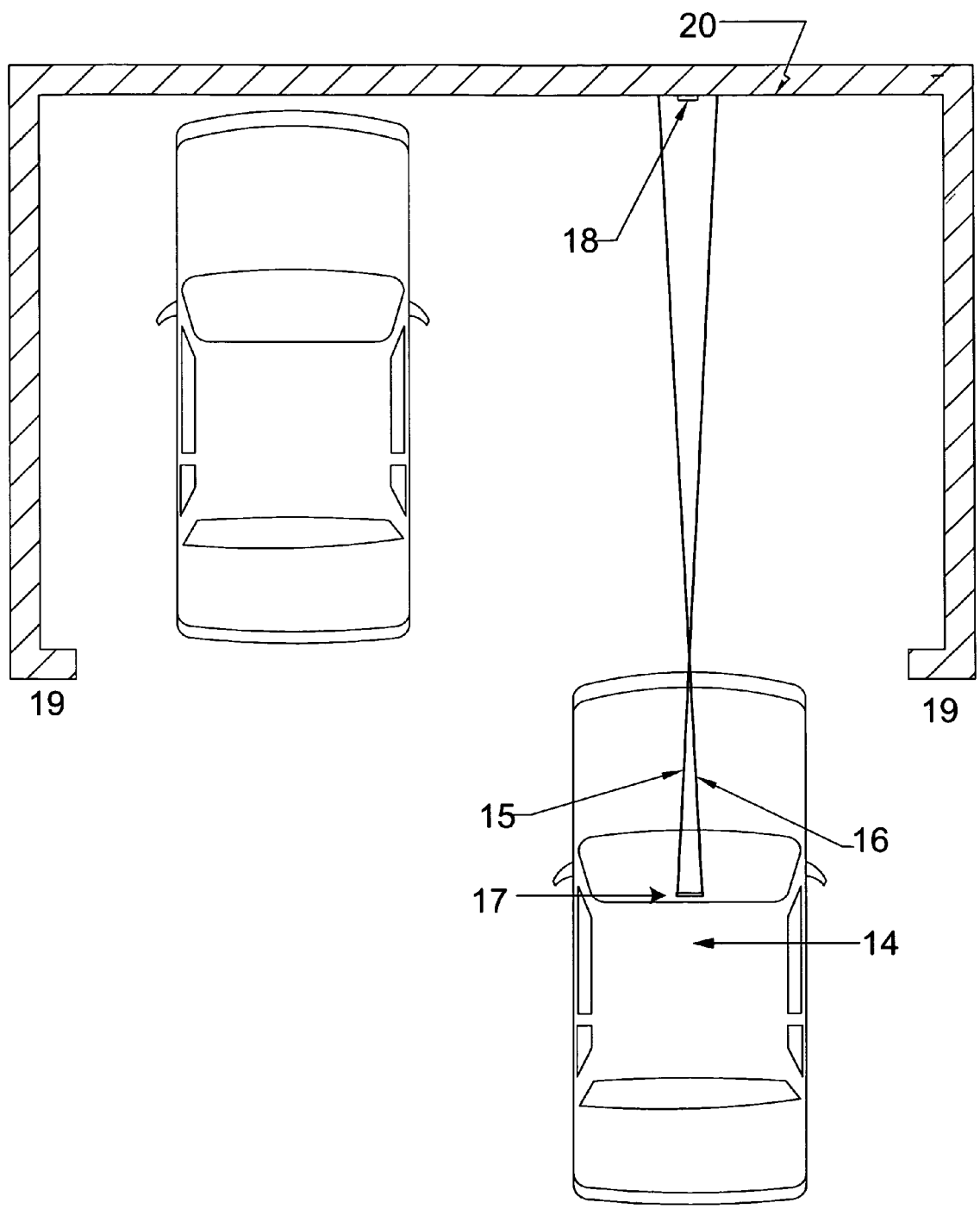
FIG. 1 is a top view of a garage illustrating a vehicle at the entrance of the garage using the temperature compensated dual laser device to guide the vehicle driver to the correct lateral and longitudinal distance to a pre-determined parking position within the garage.
Figure 4:
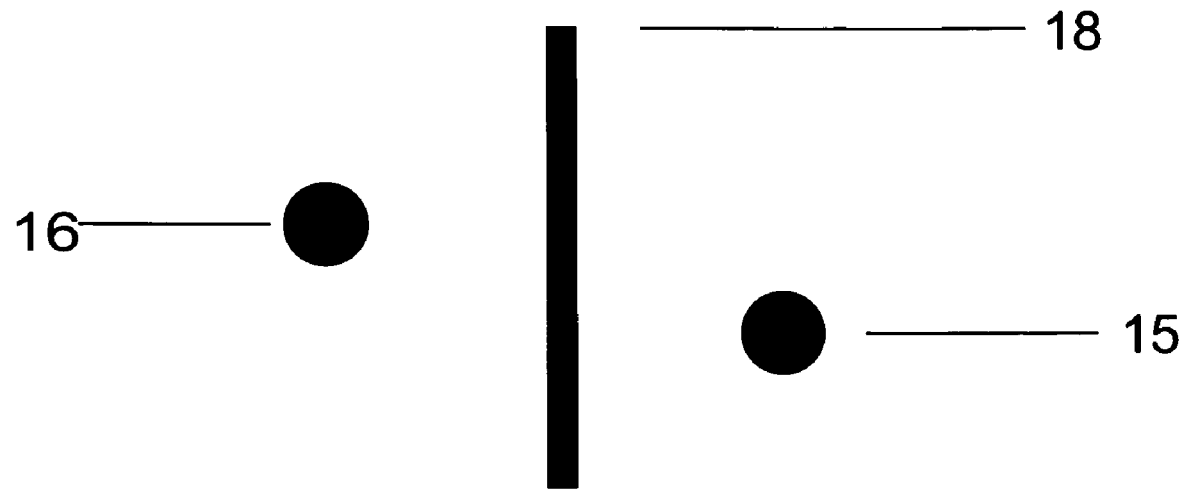
FIG. 4 is a front view of correct positioning of the dual laser beams when a vehicle reaches the entrance to the pre-calibrated parking position and the dual laser beams are correctly equidistantly aligned around the vertical line.

Referring now to the drawings wherein the showings are for purposes of illustrating a preferred embodiment of the invention only and not for purposes of limiting the same;

FIG. 1 shows a top view of a vehicle, 14, projecting two laser beams, 15 and 16 that are guiding the vehicle driver at the entrance of a parking garage with sidewalls, 19, and forward wall, 20. The two laser beams, 15 and 16 must be guided by the vehicle operator such that they remain equidistantly placed around the vertical line, 18, throughout the parking approach, as shown in FIG. 4. The dual laser beam device, 17, can be mounted to the windshield, the dashboard of vehicle, 14, or incorporated into the rear view mirror mounting bracket.

Figure 2:
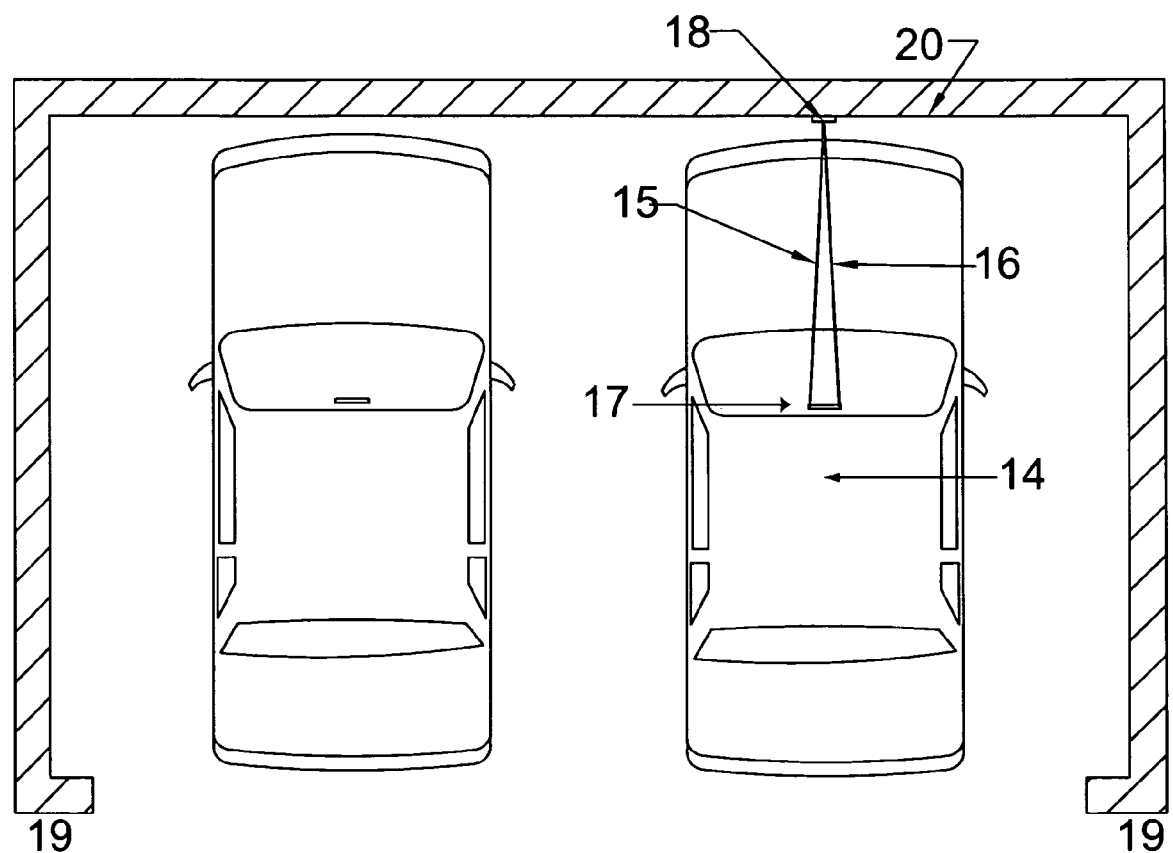
FIG. 2 is a top view of a garage illustrating a parked vehicle using the temperature compensated dual laser device and described method to achieve longitudinal and lateral distance control in a pre-determined parking position within the garage.
Figure 5:
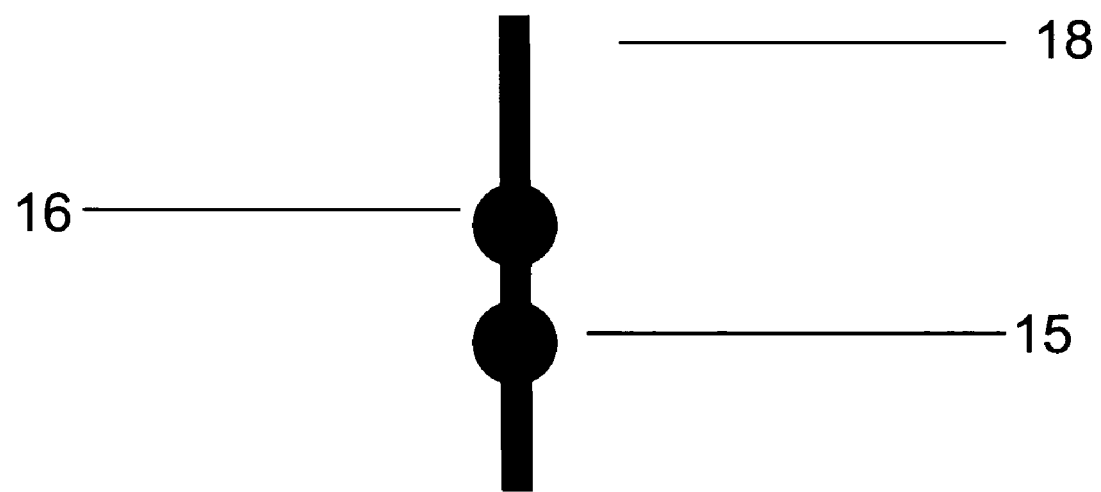
FIG. 5 is a front view of the converged laser beams on the target when the vehicle has reached the correct pre-calibrated parking position when both laser dots have converged on the vertical line.

FIG. 2 shows the vehicle, 14, with the dual laser device, 17, projecting two laser beams, 15 and 16, such that the laser beams, 15 and 16, have converged on the vertical line, 18, as shown in FIG. 5 thus achieving the pre-determined location.

Figure 3:
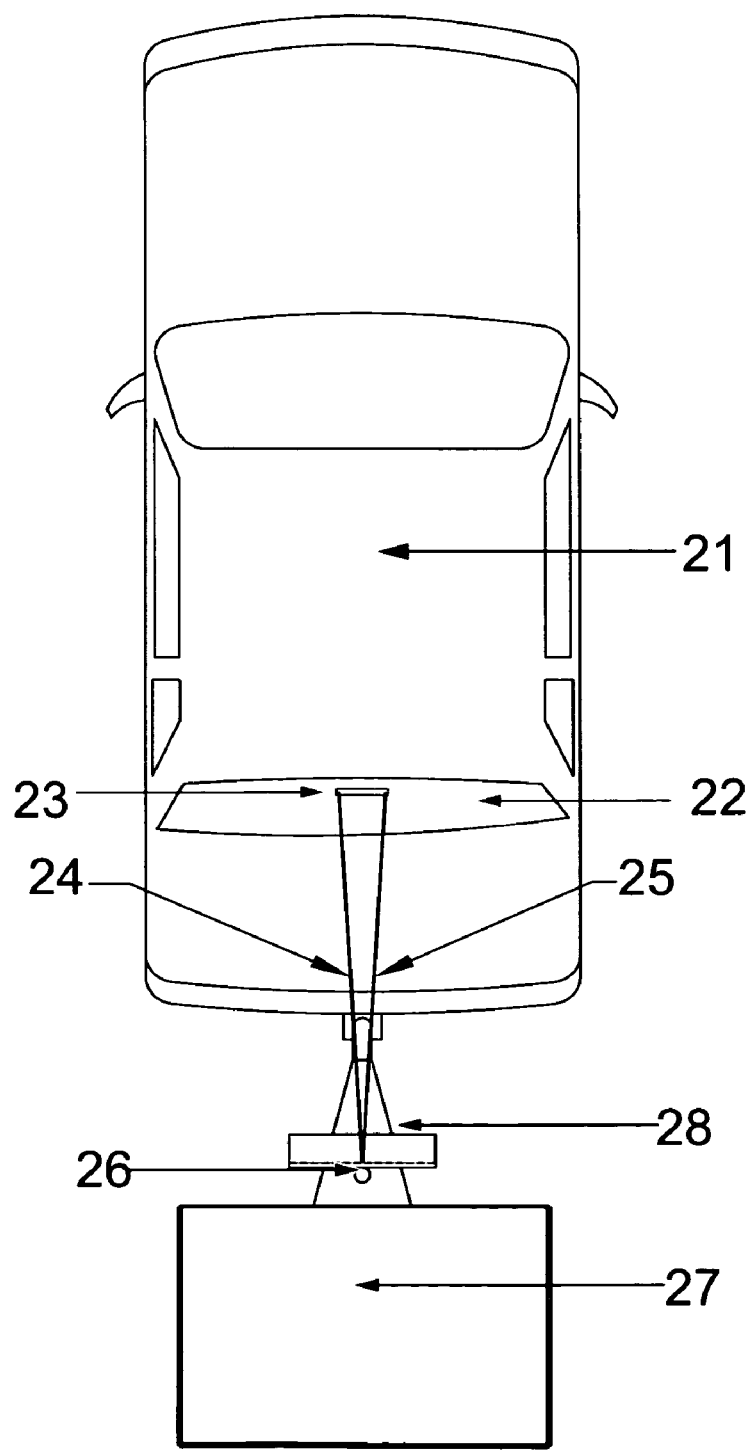
FIG. 3 is a top view of a towing vehicle located at the proper parking position for correct lateral and longitudinal positioning of a towing vehicle for engagement to the towed object.

FIG. 3 shows a vehicle, 21, utilizing the dual laser guidance and parking device, 23 on the rear window, 22, projecting two laser beams, 24 and 25, on a vertical target, 26, on the trailer hitch, 28, of the towed object, 27. An enclosed shroud, 28, placed over the vertical line shields the vertical line in bright light conditions to allow the vehicle operator to see the laser dots for vehicle positioning. Most inside parking area such as garages and parking decks with a roof allow the use of the dual laser guidance and parking device without a shroud, 28, with good visibility of the visible laser beam outputs to provide continuous guidance to the vehicle operator. However, in outdoor sunlight conditions, red laser devices with 650 nm or 635 nm wavelength may not have sufficient brightness to be effectively seen. Lasers that are significantly brighter at the same power levels of red lasers are available, for example, green lasers with a wavelength of 532 nm, are available, however they are generally ten times the cost of red lasers with 650 nm or 635 nm wavelengths. Increasing the power output of the laser diodes also increases the visibility in sunlight conditions. However, all laser devices are regulated by the U.S. FDA Center for Devices and Radiological Health under CFR Title 21, part 1040.10, for output power for eye protection. Under a Class 111a classification, a laser device when measured through a 7 millimeter aperture can emit a maximum of 5 milliwatt of power. The invention of this application has a significant advantage over devices or methods that use laser dots that converge on each other, rather than on a vertical line; since the laser power measured per FDA requirements will be approximately 50% of converging laser devices or methods since the separation distance between the two laser dots on the vertical line is greater than 7 millimeters. This allows the use of higher power red lasers and therefore higher brightness and visibility in sunlight while still falling under an FDA Class 111a classification. A higher power FDA classification, such as Class 111b, requires additional components, cost, and complexity for FDA compliance. Thus, the invention of this application produces a superior product with higher outdoor brightness resulting in increased eye safety than any competitive product using lasers that converge directly on each other.

FIG. 4 is a front view of a vertical surface with an applied vertical line 18, that shows correct positioning of laser beams, 15 and 16 during the initial parking approach as shown in FIG. 1 that are equidistantly centered around the vertical line, 18, to achieve correct lateral positioning at a pre-calibrated location. This equidistant spacing around the vertical line must be kept continuously as the vehicle approaches the pre-determined location.

FIG. 5 is a front view of a vertical surface with an applied vertical line, 18, that shows correct positioning of laser beams, 15 and 16, that have converged on the vertical line and result in correct lateral and longitudinal position of the vehicle, at the pre-calibrated parking position as shown in FIG. 2. In order to achieve precise lateral and longitudinal positioning to the pre-calibrated parking position, the equidistant spacing of the laser dots around the vertical line must be maintained continuously from the initial entrance to the final position as shown in FIGS. 1 and FIG. 2.

Figure 6:
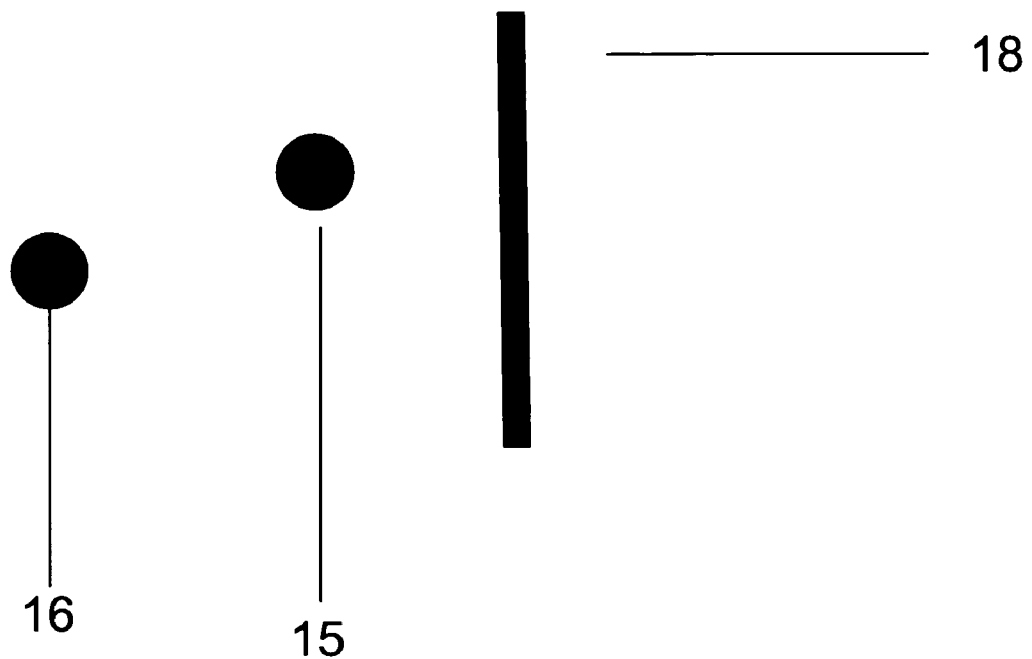
FIG. 6 is a front view of incorrect positioning of the dual laser beams when a vehicle reaches the parking position entrance at an incorrect 30 degree right angle orientation that will not achieve correct lateral and longitudinal distance positioning in the pre-calibrated position.

FIG. 6 is a front view of a vertical surface with a vertical line, 18 that shows incorrect positioning of laser beams, 15 and 16, that result from a 30° right entrance angle during the initial parking approach at the entrance to the pre-calibrated parking position.

Figure 7:
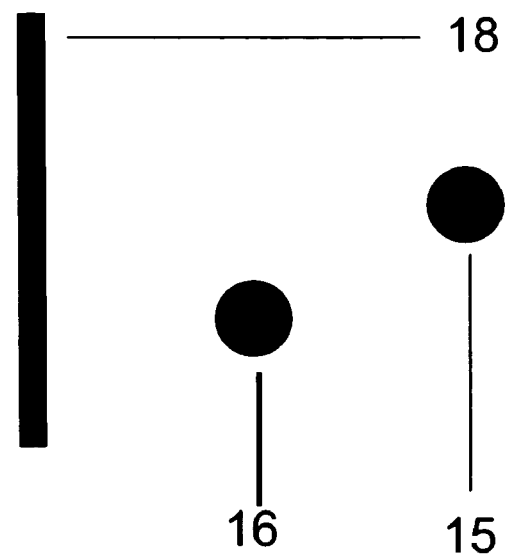
FIG. 7 is a front view of incorrect positioning of the dual laser beams when a vehicle reaches the parking position entrance at an incorrect 30 degree left angle orientation that will not achieve accurate lateral and longitudinal distance positioning in the pre-calibrated location.

FIG. 7 is a front view of a vertical surface with a vertical line, 18 that shows incorrect positioning of laser beams, 15 and 16, that result from a 30° left entrance angle during the initial parking approach at the entrance to the pre-calibrated parking position.

Figure 8:
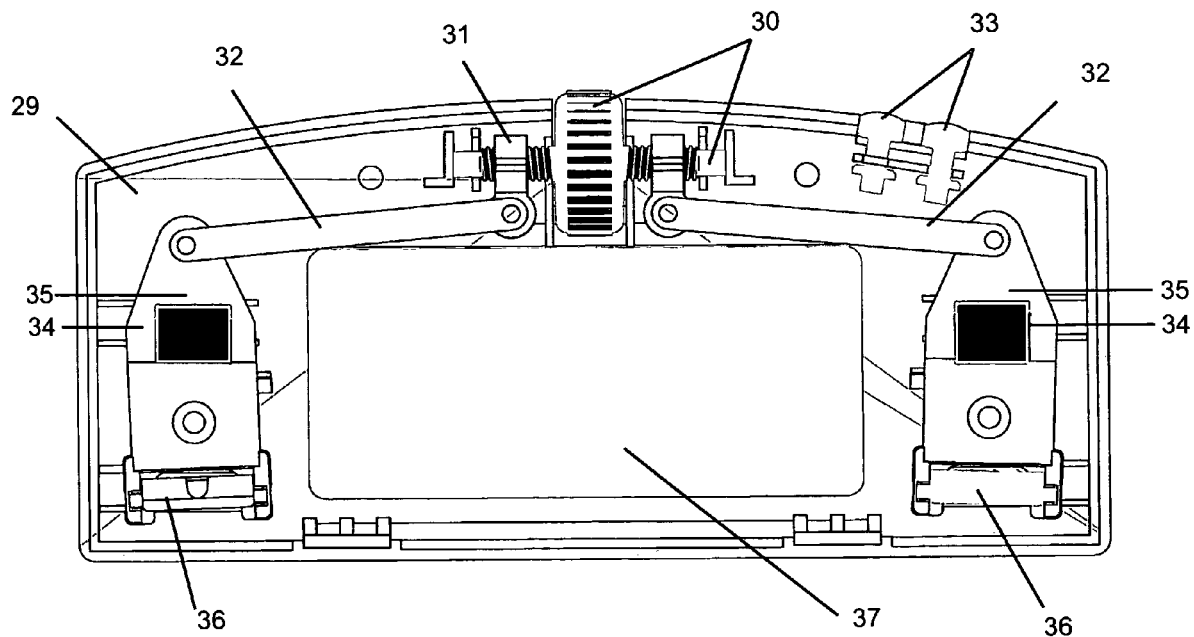
FIG. 8 is a top view of one of the preferred embodiments of the dual laser device with temperature compensation based on use of different thermal expansion materials.

FIG. 8 illustrates one of the preferred embodiments of a dual laser device that controls the laser convergence through the use of a horizontal adjustment wheel and threaded shaft, 30, that simultaneously adjusts the angle of both lasers. The laser diodes, 34, are mounted in laser diode tables, 35, and then permanently locked in place with locking rings, 36. The laser diode tables, 35, both pivot to control the angle of both laser diodes, 34, thus controlling the convergence point of the two laser beams. The laser diode holder tables, 35, are attached to connecting rods, 32, that are attached to adjusting nuts, 31, which are laterally moved by the rotation of the horizontal adjustment wheel and threaded shaft, 30. The printed circuit board, 37, contains the circuitry for automatic time on and time off control and an activation switch, 33, to turn on the dual laser device. The overall bottom enclosure for all the laser control components is as shown in 29. The dual laser device is battery powered typically by 2 AAA batteries producing approximately 3 volts D.C.

In temperature extremes within the vehicle interior, it has been discovered that primarily due to thermal expansion of the unit casing, 29; the connecting rods, 32; and the horizontal adjustment wheel and threaded shaft, 30, that the lasers convergence point can vary by up to 6 inches in a eight foot distance resulting from a temperature change from 0° F. to 150° F. It has also been discovered that by use of a proper lower linear thermal coefficient of expansion material for the connecting rods, 30, and the horizontal wheel and threaded shaft different from the polymeric unit casing, 29, that the laser convergence point will remain relatively unchanged (+/−1.0 inch) throughout that temperature use range. Polymeric materials with thermal expansion coefficients of 40-80 microinch/inch per degree Fahrenheit can be used for all components, except the connecting rods, 32 and the horizontal adjustment wheel and threaded shaft. However, the connecting rods, 32 and the horizontal adjustment wheel and threaded shaft, 30 should be made from alternate metallic materials with significantly lower thermal expansion coefficients of approximately 6 to 20 microinch/inch per degree Fahrenheit as required to achieve thermal balance in the particular dual laser device.

It is also critical that the polymeric materials used in the dual laser device have the required high temperature properties to prevent any softening, creep, or thermal distortion that would affect calibration accuracy when the dual laser device is exposed to high temperatures. Examples of suitable polymeric materials include ABS, glass filled ABS, and polycarbonate.

Figure 9:
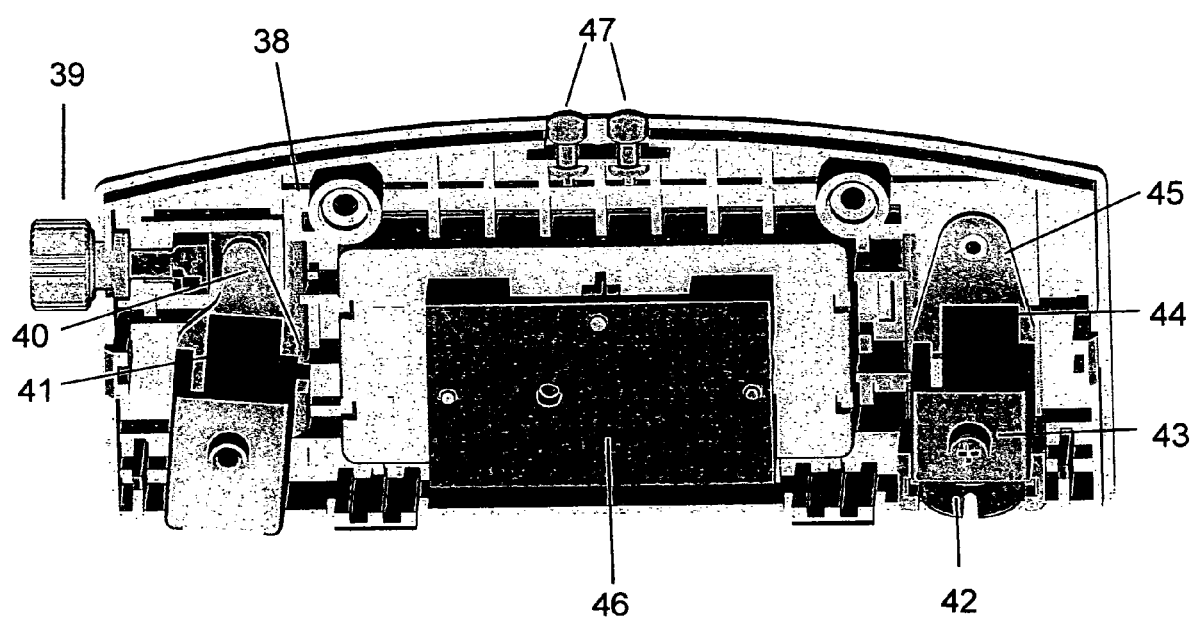
FIG. 9 is a top view of another of the preferred embodiments of the dual laser device with temperature compensation based on its inherent design.

FIG. 9 illustrates another preferred embodiment of a dual laser device that uses an inherent design that is self temperature compensating without the use of components utilizing materials with different thermal expansion coefficients. Two laser diodes, 41 and 44 are inserted into a fixed angle laser diode holder, 45 with a locking ring, 42 and an angle adjustable diode holder, 40 adjustable by using the side adjusting mechanism, 39 in the bottom enclosure, 38. The printed circuit board, 46 is used with the touch electrodes, 47, to control the power on and automatic power shut off. This embodiment relies on an inherent design utilizing the same polymeric materials of construction, rather than different materials of construction with different coefficients of linear thermal expansion. To achieve thermal balance and, therefore, constant calibration accuracy of the dual laser device, one laser diode table, 45, is fixed at 89° to the surface of the case enclosure. The other laser table, 40 is adjustable with a side adjustable mechanism, 39 to allow calibration of the lasers. To achieve accurate thermal balance, calculation of a critical angle is necessary. The critical angle is the angle between the longitudinal centerline of the diode table, 40 to the front surface of the case enclosure while the lasers are converging at an optimal distance, 39. When the length of the adjusting mechanism, 39 is equal to the distance from the pivot point of the diode table, 40 to the outside of the enclosure where the adjustment originates, 38, the laser device is thermally balanced when using constant materials of construction at a distance of 8 feet. Table 1 summarizes test results of a dual laser device made in accordance as above when tested from a temperature range of 0° F. to 150° F.:

TABLE 1

Model-Inherently Temperature Compensating Dual Laser Device

| Temperature | Time @Temp., hr. | Δ from original, in. (minus is closer to target) | |
|---|---|---|---|
| | | Sample #1 | Sample #2 |
| Start | | 0 | 0 |
| 1a - 0° F. | 1 | 0 | 0 |
| 1b - 72° F. | 1 | −0.7 | 0 |
| 2a - 150° F. | 1 | +0.7 | +0.7 |
| 2b - 72° F. | 1 | 0 | +1.5 |
| 3a - 0° F. | 2 | 0 | 0 |
| 3b - 72° F. | 1 | 0 | 0 |
| 4a - 150° F. | 14 | +2 | +1.5 |
| 4b - 72° F. | 1 | +1 | +2 |
| 5a - 0° F. | 1 | 0 | −1 |
| 5b - 72° F. | 1 | −1.5 | 0 |
| 6a - 150 F. | 1 | 0 | 0 |
| 6b - 72° F. | 1 | 0 | 0 |
| 7a - 0 F. | 14 | 0 | 0 |
| 7b - 72° F. | 1 | 0 | 0 |

Increased accuracy of the preferred embodiments shown in FIG. 8 and FIG. 9 can be achieved by increasing the distance between the laser diodes to decrease the effects of angular change on the calibration point.

Figure 10:
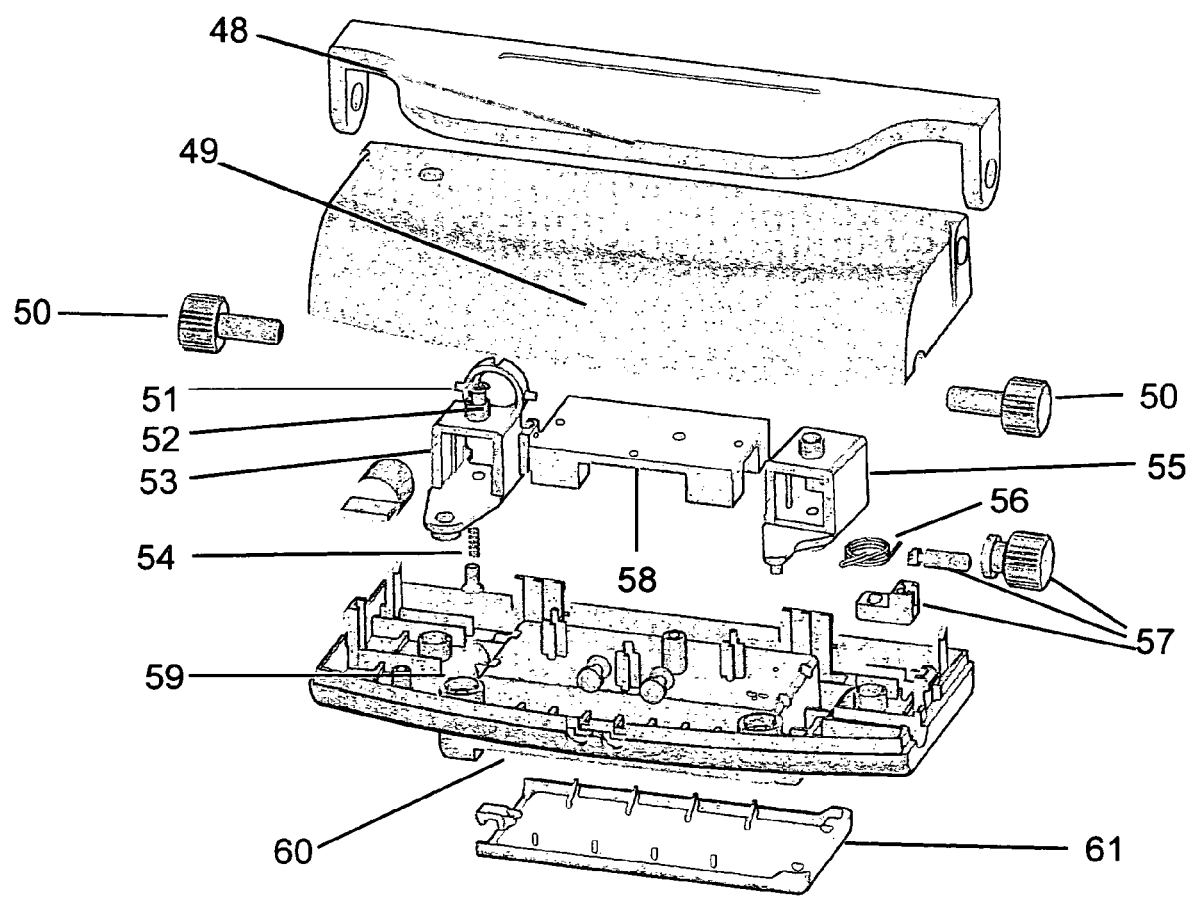
FIG. 10 is an exploded view of the preferred embodiment of FIG. 9.

FIG. 10 shows an exploded view of the device of FIG. 9. A mounting bracket, 48, is attached to the top enclosure, 49, which is mounted using mounting screws, 50, and allows vertical adjustment of the laser diode impingement points on a vertical line. A locking ring, 51, is shown with the fixed laser diode table, 53 to insert the laser diode. A vertical height adjustment, 52, used with a compression spring, 54 is used to adjust the vertical height of the fixed laser diode relative to the adjustable laser diode table, 55 to control laser diode impingement separation. A torsion spring, 56 is used to provide constant tension on the adjustable laser diode table, 55, which is adjusted by side adjustable mechanism of 57.

58, is the battery and printed circuit board base. The lower enclosure, 59 contains the battery box, 60. 61, is the battery cover.

Figure 11:
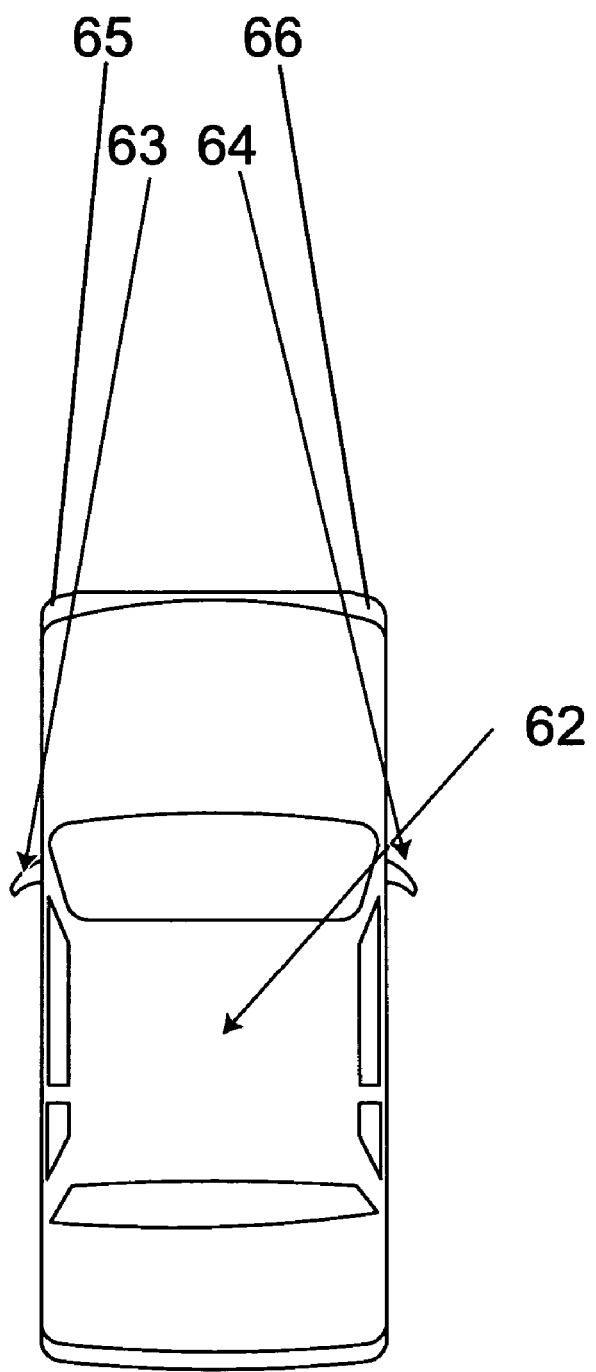
FIG. 11 is a top view of a dual laser system using two lasers mounted externally on the front of the vehicle in the headlight or mirror assemblies for guiding the vehicle to a pre determined lateral and longitudinal position.

FIG. 11 is a top view of an externally mounted dual laser system on the front of a vehicle, 62, for guiding the vehicle to a pre determined position using the methods previously described. It is been discovered that due to thermal expansion or contraction of the vehicle itself in broad temperature extremes, as well as the laser holding devices used on the vehicle, that temperature compensation in the laser holding devices is required to maintain the pre set calibration point of the dual laser device. The lasers, mounted in a laser holding device, are shown mounted in the front of the rear view mirrors, 63 and 64 and also shown mounted in the front headlight assemblies, as shown in 65 and 66. Other convenient forward mounting locations can be chosen and remote activation and adjustment of the lasers is anticipated from inside the vehicle, 61.

Figure 12:
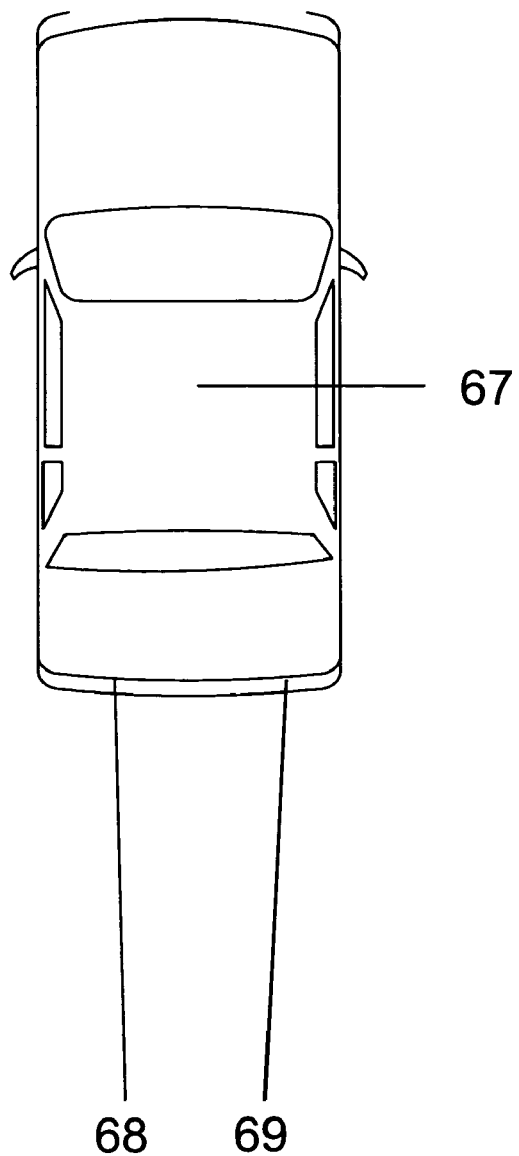
FIG. 12 is a top view of a dual laser system using two lasers mounted externally on the rear of the vehicle in the rear taillight assemblies for guiding the vehicle to a pre determined position for vehicle parking or towing hook up alignment purposes.

FIG. 12 is a top view of externally mounted dual laser system on the rear of the vehicle, 67, for towing hook up alignment purposes using the methods previously described. The lasers, mounted in a laser holding device, are shown mounted in the rear taillight assembly in 68 and 69. Other convenient rearward mounting locations can be chosen and remote activation and adjustment of the lasers is anticipated from inside of the vehicle, 67.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:

1. A vehicle parking system using two converging lasers emitting from a vehicle positioning device from an interior or enclosed exterior location of a vehicle for use in longitudinal and lateral parking position control of vehicle comprising:
   (a) two laser emitting diodes producing visible outputs on a forward or rearward surface, utilizing a vertical line such that the two visible laser outputs are equidistantly aligned horizontally around the vertical line on the forward or rearward surface continuously during parking for achieving lateral distance control to a pre determined location;
   (b) two converging laser emitting diodes that align vertically during parking on a surface forward or rearward pre-determined vertical line for achieving longitudinal distance control to that pre-determined location;
   (c) at least one angle adjustment control for one of the laser emitting diodes for calibration of the intersection point of the two visible laser beam outputs; and
   (d) wherein the vehicle positioning device is of a temperature compensating design to preserve the lateral and longitudinal calibration point in both hot and cold conditions.

2. A vehicle parking system according to claim 1 wherein the vehicle positioning device is of an automatic temperature compensating design to preserve the longitudinal and lateral calibration point in both cold and hot conditions to the pre-adjusted calibration point of the two visible laser outputs.

3. A vehicle parking system according to claim 2, wherein a light blocking shroud is used around the vertical line to improve the visibility of the two visible laser beam outputs.

4. The vehicle positioning device according to claim 2, wherein a single laser diode adjustment control is used to adjust the angle of both laser emitting diodes and utilizes components of optimal thermal expansion coefficients to achieve automatic temperature compensation of the pre-adjusted calibration point of the two visible laser outputs.

5. The vehicle positioning device according to claim 2, wherein at least one laser diode adjustment control is used to adjust the angle of at least one laser emitting diode and the inherent design of the vehicle positioning device results in automatic temperature compensation of the pre-adjusted calibration point of the two visible laser outputs.

6. The vehicle positioning device according to claim 2, wherein a bracket is adaptable for mounting the device to either the windshield, dashboard, or interior inside front of the vehicle.

7. The vehicle positioning device of claim 2, wherein an electronic control circuit is used to control the activation and automatic shut off time of the lasers to preserve battery life and prevent inadvertent continuous use of the device.

8. The vehicle positioning device of claim 2, wherein remote activation is actively achieved using hand held radio frequency or infrared transmitters with radio frequency or infrared receivers in the electronic circuit of the device.

9. The vehicle positioning device of claim 2, wherein automatic activation is achieved when opening the garage door by incorporating a radio frequency receiver in the electronic control circuit of the device.

10. The vehicle positioning device according to claim 2 wherein the device is attached to the vehicle with internally or externally mounted enclosed individual lasers wherein one or both lasers are adjustable and are temperature compensating.

11. A vehicle positioning device according to claim 10 wherein the parking device has at least one remotely adjustable laser and an activation switch that is activated from inside the vehicle.

12. A method of vehicle guidance and parking comprising:
   (a) Parking the vehicle is parked in the desired parking position;
   (b) Calibrating a temperature compensating dual laser beam device to a vertical line placed forward or rearward of the vehicle by adjusting the dual laser outputs and vertical position on the device such that both visible laser beam outputs intersect on the vertical line;
   (c) Use of a light blocking shroud around a vertical line that shields the vertical line from bright sunlight when necessary to improve the visibility of the two visible laser beam outputs
   (d) When entering the garage or parking space for the vehicle, the temperature compensated dual lasers are aimed by the vehicle operator such that the visible laser outputs are equidistantly spaced about the surface forward vertical line
   (e) The equidistant spacing of the two projected laser dots around the surface forward vertical line is maintained while approaching the desired calibrated parking position;
   (f) The vehicle is stopped when both visible laser beam outputs vertically intersect on the surface forward or rearward vertical line.

* * * * *